United States Patent [19]

Millard

[11] 4,178,835
[45] Dec. 18, 1979

[54] ROTARY VALVE FOR POWER-ASSISTED STEERING MECHANISM

[75] Inventor: Barry J. Millard, Reading, England

[73] Assignee: Adwest Engineering Limited, Great Britain

[21] Appl. No.: 873,679

[22] Filed: Jan. 30, 1978

[30] Foreign Application Priority Data

Feb. 16, 1977 [GB] United Kingdom ............... 6382/77

[51] Int. Cl.$^2$ ............................................. F15B 9/10
[52] U.S. Cl. .................................... 91/375 A; 137/596
[58] Field of Search .................... 91/375 A, 375 R; 137/625.24, 596

[56] References Cited

U.S. PATENT DOCUMENTS

| | | | |
|---|---|---|---|
| 3,393,608 | 7/1968 | Saunders | 91/375 A |
| 3,525,362 | 8/1970 | Briggs | 91/375 A |
| 3,680,443 | 8/1972 | Jenvey | 91/375 A |
| 3,998,131 | 12/1976 | Adams | 91/375 A |

FOREIGN PATENT DOCUMENTS 2004587  1/1971  Fed. Rep. of Germany ........ 91/375 A Primary Examiner—Paul E. Maslousky
Attorney, Agent, or Firm—Charles W. Helzer

[57] ABSTRACT

A rotary valve in or for a power-assisted rack-and-pinion steering mechanism for a motor vehicle, the rotary valve comprising a valve sleeve, a rotor member rotatable within the valve sleeve, the rotor member and the valve sleeve each having axially extending grooves therein which cooperate to control the flow of fluid under pressure through the valve according to the angular disposition of the rotor member relative to the valve sleeve, and a torsion bar connecting the rotor member to the pinion of the rack-and-pinion steering mechanism, wherein the said pinion is cylindrical and is rigidly connected to the valve sleeve by means of an annular coupling member having an end portion which fits over an end portion of the pinion and has internal teeth which intermesh with the teeth of the pinion, the annular coupling member being brazed or otherwise bonded to both the pinion and to the valve sleeve.

11 Claims, 1 Drawing Figure

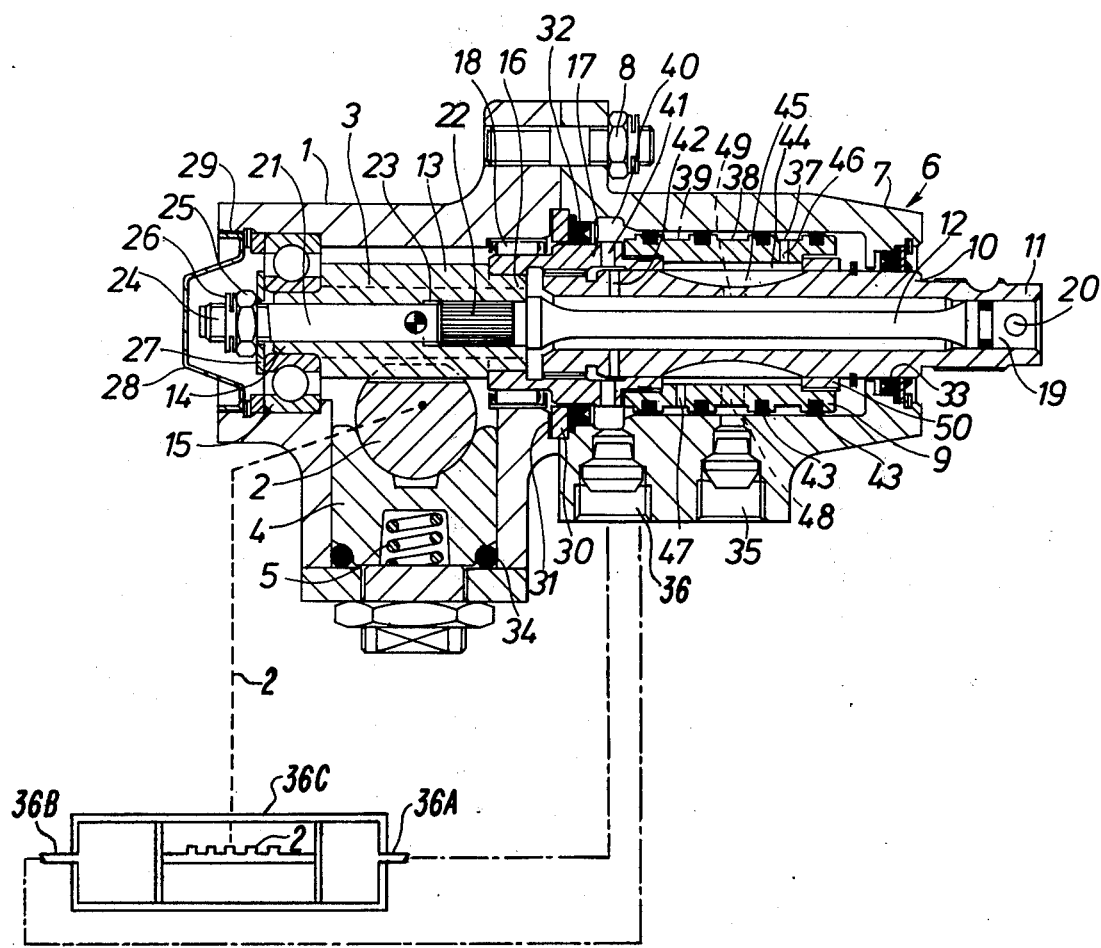

ROTARY VALVE FOR POWER-ASSISTED STEERING MECHANISM

This invention relates to power-assisted rack-and-pinion steering mechanisms for motor vehicles and more particularly to a rotary valve for use therein.

Power-assisted rack-and-pinion steering mechanisms for motor vehicles generally comprise a rotary valve for directing fluid under pressure to double-acting piston-and-cylinder means associated with the rack so that the fluid under pressure will act on said piston-and-cylinder means to assist the pinion in moving the rack axially in either of its axial directions of movement and so provide power-assistance in the steering of a vehicle to which the steering mechanism is fitted. Such rotary valves generally comprise a rotor member rotatable within a valve sleeve, the rotor member having an input connection whereby it is connectible with the steering control of a vehicle so that rotary motion will be imparted thereto when the steering control is operated and the rotor member and valve sleeve each having axially extending grooves therein which cooperate to control the flow of fluid under pressure through the valve according to the angular disposition of the rotor member relative to the valve sleeve. The valve sleeve is rigidly connected to or formed integrally with the pinion of the rack-and-pinion steering mechanism whilst the rotor member is connected to the pinion by means of a torsion bar so that rotary movement of the rotor member will be transmitted to the pinion by way of the torsion bar. One of the functions of the torsion bar is to bias the rotor member towards an "on-centre" position wherein little or no fluid under pressure will pass to the double-acting piston-and-cylinder means so as to maintain the rotor member in the "on-centre" position when the vehicle is travelling in a straight line and no rotary movement is being imparted to the rotor member by way of the steering control of the vehicle. Such a rotary value will hereinafter be referred to as a "valve of the kind described."

Because of the packaging problems which exist in modern motor vehicles there is a need to reduce the size, and in particular the axial length from the intersection of the pinion and rack axes to the input connection, of rotary valves of the kind described. One of the factors which has influenced the said axial length of rotary valves of the kind described is the area of "runout", i.e., teeth which are not whole or perfect, which occurs when cutting the pinion teeth on the pinion. "Run-out" can be avoided when hobbing the teeth on the pinion, but only where the root diameter of the pinion is sufficient to allow undercutting of the pinion teeth to the root diameter in conventional gear cutting fashion, which is not normally the case with the pinion of a rack-and-pinion steering mechanism. Also undercutting of the pinion teeth necessitates the use of a very small hob which is detrimental both to the surface finish of the pinion teeth and their form. Another factor is the length of the torsion bar which, if reduced to too great an extent, raises the stress in the material from which the torsion bar is made to an undesirable high. This latter problem can be overcome by increasing the yield strength of the material from which the torsion bar is made but this introduces further problems since the machining of the torsion bar then becomes more difficult and/or uneconomic.

Normally, in rotary valves of the kind described, the rotor member is hollow and the torsion bar extends through the rotor member, one end of the torsion bar being connected to the outer end of the rotor member, i.e., that end of the rotor member remote from the pinion, whilst the other end of the torsion bar is connected to the inner end of the pinion, i.e., that end of the pinion nearest the rotor member.

One proposal for reducing the stress in the torsion bar of a rotary valve of the kind described has been to make the pinion hollow and to carry the torsion bar through the hollow pinion and secure it to the outer end of the pinion by drilling and pinning through the pinion and an enlarged end portion of the torsion bar. However, because the diameter of the enlarged end portion of the torsion bar has had to be sufficient to allow for drilling and pinning as aforesaid, this has necessitated so increasing the outer diameter of the pinion that to achieve design steering ratios the helix angle of the pinion teeth has had to be increased to an extent such as to result in slow or non-existent recovery of the steering to the straight-ahead position after a turn has been made. This can only be overcome by increasing the castor forces in the steering system of the motor vehicle and this leads to problems when both manual and power-assisted steering options are offered on the same vehicle since with a manual rack-and-pinion steering mechanism high castor forces produce unacceptable "kick-back" at the steering control of the vehicle.

The present invention provides a rotary valve of the kind described wherein the pinion is cylindrical and an annular coupling member connects the valve sleeve to the pinion, one end portion of said annular coupling member being fitted over an end portion of the pinion and having internal teeth which intermesh with the teeth of the pinion, the annular coupling member being bonded to the pinion and to the valve sleeve. The torsion bar is preferably an interference fit in an aperture in the pinion.

Because the pinion is in the form of a cylinder and the teeth thereof are used for connecting it to the valve sleeve, the teeth of the pinion can extend over the whole of the axial length of the pinion and accordingly "run-out" can be avoided entirely.

Preferably the pinion is in the form of a hollow cylinder which is open at both ends and the torsion bar has an extension on one end thereof which is an interference fit in the pinion and which extends right through the pinion and is secured by suitable securing means such as a nut or nuts threaded onto a threaded end portion of said extension. As the torsion bar is an interference fit in the pinion and can be further secured by nut or other suitable securing means as aforesaid, said extension can be of smaller diameter than would be required if the torsion bar and pinion were to be connected by drilling and pinning with the result that there is no necessity for any increase in the outside diamter of the pinion. Also said extension on the torsion bar enables the torsion bar to be assembled with the pinion by drawing it into the pinion rather than by pressing it into the pinion, thus avoiding press marks or other damage which can occur to the torsion bar or pinion when the torsion bar is pressed into the pinion. Moreover the securing means on the end of said extension can also serve to retain a bearing, e.g., a ball or roller bearing, in which the pinion is mounted and this has advantages since normally the retaining means is provided on the pinion itself and has to be stopped-off during carburising of the pinion.

Preferably the annular coupling member is bonded to the pinion and to the valve sleeve by brazing.

The invention also provides a method of forming a rotary valve of the kind described which comprises obtaining a cylindrical pinion and connecting the pinion to the valve sleeve by means of an annular coupling member one end portion of which is fitted over an end portion of the pinion and has internal teeth which intermesh with the teeth of the pinion, the annular coupling member being bonded to the pinion and to the valve sleeve. The method preferably further comprises interference fitting the torsion bar in an aperture in the pinion.

Preferably the pinion is in the form of a hollow cylinder which is open at both ends and the torsion bar has an extension on one end thereof which is interference fitted in the pinion and which extends right through the pinion and is secured by suitable securing means such as a nut or nuts threaded onto a threaded end portion of said extension, the torsion bar being interference fitted in the pinion by drawing it into the pinion by means of said extension.

The invention further provides a power-assisted rack-and-pinion steering mechanism when provided with a rotary valve according to the present invention and a vehicle when fitted with such a power-assisted rack-and-pinion steering mechanism.

The invention will be further described with reference to the accompanying drawing which shows in cross-section a power-assisted rack-and-pinion steering mechanism having a rotary valve according to the present invention.

The rack-and-pinion steering mechanism illustrated comprises an elongate rack housing 1 in which a toothed rack 2 is mounted for longitudinal movement, the toothed rack 2 being urged into meshing engagement with a pinion 3 by means of a pad 4 and compression spring 5. Although not shown in the drawing, fluid pressure operated double-acting piston-and-cylinder means are associated with the rack for assisting the pinion in moving the rack, as is conventional in such steering mechanisms.

The rotary valve according to the present invention is shown generally at 6 and comprises a valve housing 7 secured to the rack housing 1 by means of bolts 8 (only one of which is shown), a valve sleeve 9 within the housing, a rotor member 10 rotatably mounted in the valve sleeve 9 and having an input connection 11 whereby it is connectible with the steering control of a motor vehicle, and a torsion bar 12 connecting the rotor member 10 to the pinion 3.

The pinion 3, which is in the form of a hollow cylinder, has teeth 13 extending longitudinally thereof which mesh with the teeth of the toothed rack 2. The teeth 13 may be either straight or helical according to design requirements. At its outer end the pinion 3 has a reduced diameter end portion 14 on which is mounted a ball bearing 15 supporting the pinion 3 in the rack housing 1. At its other end the pinion 3 has an end portion 16 the teeth 13 of which have been reduced in height. Connecting the pinion 3 to the valve sleeve 9 is an annular coupling member 17 one end of which fits over the end portion 16 of the pinion 3 and has internal teeth of similarly reduced height which intermesh with the teeth 13 of the end portion 16 to provide a mechanical coupling between the pinion 3 and coupling member 17. At its other end the coupling member 17 is of reduced diameter and fits within the adjacent end portion of the valve sleeve 9. The coupling member 17 is brazed to both the pinion 3 and to the valve sleeve 9. A roller bearing 18 supports the coupling member 17, and hence the pinion 3, in the rack housing 1. Thus the pinion 3 is supported at one end by the ball bearing 15 and at the other end by the roller bearing 18.

The rotor member 10 is hollow and has the torsion bar 12 extending therethrough as shown. The torsion bar 12 has an enlarged end portion 19 which is received within the input connection 11 of the rotor member 10 and is connected to the rotor member 10 by drilling through both the input connection 11 and the enlarged end portion 19 and inserting a dowel pin 20 therethrough. At its other end the torsion bar 12 has an extension 21 which extends through the hollow pinion 3. The extension 21 has at one end thereof splines 22 which are an interference fit with mating internal splines 23 of the pinion 3 and at its other end has a screw-threaded end portion 24 with which is threadedly engaged a retaining nut 25 and a lock nut 26. Interposed between the retaining nut 25 and the pinion 3 is a washer 27 which serves as a retainer for the ball bearing 15. A press-fitted metal cap 28 closes the rack housing 1, a suitable resilient seal 29, which may be bonded to the metal cap 28, being interposed between the metal cap 28 and the rack housing 1. As will be seen the extension 21 of the torsion bar 12 is a close fit within the hollow pinion 3 and so provides internal support for the pinion 3.

A metal washer 30 having a resilient sealing washer 31 on one side thereof and a high pressure annular oil seal 32 on the other side thereof is interposed between rack housing 1 and the valve housing 7 as shown, this arrangement facilitating the insertion of the high pressure annular oil seal 32.

A further high pressure annular oil seal 33 is provided between the rotor member 10 and the outer end of the valve housing 7. An O-ring seal 34 is provided around the pad 4.

The valve housing 7 has therein an inlet port 35 connectible with a source of fluid under pressure, an outlet port 36 connectible with a reservoir for the fluid, and first and second cylinder ports shown schematically at 36A and 36B connectible with opposite sides of the double-acting piston-and-cylinder means 36C. The valve sleeve 9 has annular grooves 37, 38 and 39 in the external surface thereof which communicate respectively with the first cylinder port, the inlet port 35, and the second cylinder port. The outlet port 36 communicates with the interior of the hollow rotor member 10 by way of annular passage 40, radial passage 41 in the coupling member 17 and radial passage 42 in the rotor member 10. The annular grooves 37, 38 and 39 and the annular passage 40 are sealed from one another by annular seals 43. The internal surface of the valve sleeve 9 has six equally spaced axially extending grooves 44 therein whilst the external surface of the rotor member 10 has six equally spaced axially extending grooves 45 therein which cooperate with the grooves 44 to direct the flow of fluid under pressure through the valve. Alternate ones of the grooves 44 are first cylinder grooves and are connected to the first cylinder port by way of radial passages 46 in the valve sleeve 9 and annular groove 37 whilst the intermediate grooves 44 are second cylinder grooves and are connected to the second cylinder port by way of radial passages 47 in the valve sleeve 9 and annular groove 39. Alternate ones of the grooves 45 are inlet grooves and are connected to the inlet port 35 by way of radial passages 48 in the valve sleeve 9 and annular groove 38, whilst the intermediate grooves 45 are outlet grooves and are connected to the interior of the hollow rotor member 10 by way of radial passages 49 in the rotor member 10. When the valve is in the "on-centre" position, which corresponds to steering in a straight line, the grooves 45 are centred between the grooves 44 and communicate said first cylinder grooves 44 with the second cylinder grooves 44 so that fluid under pressure can flow freely through the valve from the inlet port 35 to the outlet port 36 and the pressures at the first and second cylinder ports, and hence on both sides of the double-acting piston-and-cylinder means, will be equal. When the rotor member 10 is turned relative to the valve sleeve 9 in one direction or the other from its "on-centre" position relative rotation between the rotor member 10 and valve sleeve 9 takes place due to the direct connection of rotor member 10 via input connection 11 to the steering control of a motor vehicle. The pinion 3 and rack 2 constitute a system load or drag on torsion bar 12 which causes the end of torsion bar 12 connected to pinion 3 to twist relative to the input end. Since valve sleeve 9 is connected to pinion 3 via coupling member 17, this twisting of torsion bar 12 results in relative rotational movement between rotor member 10 and valve sleeve 9. As a result communication will be cut-off between said inlet grooves 45 and either said first cylinder grooves 44 or said second cylinder grooves 44 and between said outlet grooves 45 and either said second cylinder grooves 44 or said first cylinder grooves 44 and fluid under pressure will be directed to one of said cylinder ports whilst the other of said cylinder ports will be connected to reservoir. It will be appreciated, therefore, that relative rotation of the rotor member 10 and valve sleeve 9 as described above, results in initially stressing torsion bar 12 and actuates the double-acting piston-and-cylinder means (shown schematically at 36C) to assist pinion 3 by moving rack 2 in a well known manner. Movement of rack 2 is in a direction which relieves the stress on torsion bar 12 and restores rotor member 10 and valve sleeve 9 to their initial "on-centre" position until the steering mechanism is again turned by an operator of the vehicle. Preferably the sides of the grooves 44 and/or the grooves 45 are shaped, e.g., as described in British Pat. No. 1,308,992, to provide metering of the fluid under pressure through the valve.

The pinion 3 is preferably formed by cutting the teeth 13 over the whole of the axial length of a cylindrical workpiece, so avoiding "run-out" or undercutting of the teeth 13, and then machining the workpiece to produce the reduced diameter end portion 14 and the end portion 16 having teeth 13 of reduced height. Likewise the valve sleeve 9 is preferably formed from a hollow cylindrical workpiece by forming the grooves 44 over the whole of the axial length of the internal surface thereof and then machining the workpiece to produce a counterbore at one end thereof which receives the reduced diameter end portion of the coupling member 17 and a counterbore at the other end thereof in which is press-fitted a stop-off ring 50. Thus the ends of the grooves 44 are closed by the coupling member 17 on the one hand and the stop-off ring 50 on the other.

What is claimed is:

1. A rotary valve for a power-assisted rack-and-pinion steering mechanism for a motor vehicle, the rotary valve comprising a valve sleeve, a rotor member rotatable within the valve sleeve, the rotor member having an input connection whereby it is connectible with the steering control of a vehicle so that rotary motion will be imparted thereto when the steering control is operated, the rotor member and the valve sleeve each having axially extending grooves therein which cooperate to control the flow of fluid under pressure through the valve according to the angular disposition of the rotor member relative to the valve sleeve, a cylindrical pinion, an annular coupling member rigidly connecting the pinion to the valve sleeve, one end portion of said annular coupling member being fitted over an end portion of the pinion and having internal teeth which intermesh with the teeth of the pinion, the annular coupling member being bonded to the pinion and to the valve sleeve, and an elongated torsion bar having one end connected to the rotor member and the remaining end connected to the pinion.

2. A rotary valve according to claim 1, wherein the teeth of the pinion extend over the whole of the axial length of the pinion.

3. A rotary valve according to claim 2, wherein the teeth of said end portion of the pinion connected to the annular coupling member are reduced in height.

4. A rotary valve according to claim 1, wherein the pinion, at its end remote from said annular coupling member, has a reduced diameter end portion on which is mounted a bearing supporting the pinion.

5. A rotary valve according to claim 1, wherein the pinion is in the form of a hollow cylinder which is open at both ends and the torsion bar has an extension on one end thereof which is an interference fit in the pinion and which extends right through the pinion and is secured to the pinion by securing means.

6. A rotary valve according to claim 1, wherein said coupling member, at its end remote from the pinion, is of reduced diameter and fits within the adjacent end portion of the valve sleeve.

7. A rotary valve according to claim 1, wherein the annular coupling member is brazed to the pinion and to the valve sleeve.

8. A rotary valve according to claim 1, wherein the annular coupling member, and hence the pinion, is supported in a bearing.

9. A rotary valve according to claim 8, wherein the bearing mounted on the reduced diameter end portion of the pinion is a ball bearing and the bearing supporting the annular coupling member is a roller bearing.

10. In a power-assisted rack-and-pinion steering mechanism for a motor vehicle having a toothed rack and double-acting piston-and-cylinder means associated with the rack, the improvement comprising a cylindrical pinion in meshing engagement with the toothed rack, and a rotary valve for directing fluid under pressure to a selected side of the double-acting piston-and-cylinder means to provide power-assistance in moving the rack, the rotary valve comprising a valve sleeve, a rotor member rotatable within the valve sleeve, the rotor member having an input connection whereby it is connectible with the steering control of a vehicle so that rotary motion will be imparted thereto when the steering control is operated, the rotor member and the valve sleeve each having axially extending grooves therein which cooperate to control the flow of fluid under pressure through the valve according to the angular disposition of the rotor member relative to the valve, an annular coupling member rigidly connecting the said pinion to the valve sleeve, one end portion of said annular coupling member being fitted over an end portion of the pinion and having internal teeth which intermesh with the teeth of the pinion, the annular coupling member being bonded to the pinion and the valve sleeve, and an elongated torsion bar having one end connected to the rotor member and the remaining end connected to the pinion.

11. A method of connecting a rotary valve to a pinion of a power-assisted rack-and-pinion steering mechanism by means of an annular coupling member, the rotary valve being of the kind comprising a valve sleeve, a rotor member rotatable within the valve sleeve, the rotor member having an input connection whereby it is connectible with the steering control of a vehicle so that rotary motion will be imparted thereto when the steering control is operated, the rotor member and the valve sleeve each having axially extending grooves therein which cooperate to control the flow of fluid under pressure through the valve according to the angular disposition of the rotor member relative to the valve sleeve, a cylindrical pinion, and a torsion bar connecting one end of the rotor member to the pinion, the method comprising rigidly connecting the pinion to the valve sleeve by means of the annular coupling member one end portion of which is fitted over a toothed end portion of the pinion and has internal teeth which intermesh with the teeth of the pinion, and bonding the annular coupling member to the pinion and to the valve sleeve.

* * * * *